(12) United States Patent
Yamazaki

(10) Patent No.: US 6,491,343 B2
(45) Date of Patent: Dec. 10, 2002

(54) BOOSTER SEAT

(75) Inventor: Kojiro Yamazaki, Urawa (JP)

(73) Assignee: Combi Corporation, Tokyo-To (JP)

( * ) Notice: Subject to any disclaimer, the term of this patent is extended or adjusted under 35 U.S.C. 154(b) by 0 days.

(21) Appl. No.: 09/759,520

(22) Filed: Jan. 16, 2001

(65) Prior Publication Data

US 2001/0008349 A1 Jul. 19, 2001

(30) Foreign Application Priority Data

Jan. 14, 2000 (JP) ........................................ 2000-006984

(51) Int. Cl.[7] ................................................. A47C 7/54
(52) U.S. Cl. ............................ 297/250.1; 248/346.01; 297/256.1; 297/411.37
(58) Field of Search .................... 297/250.1, 256.11, 297/256.16, 256.13, 256.1, 311, 316, 340, 411.2, 411.31, 411.35, 411.37; 248/346.01, 346.03

(56) References Cited

U.S. PATENT DOCUMENTS

| 5,263,668 A | * | 11/1993 | Reiter | 248/346.01 |
|---|---|---|---|---|
| 5,478,135 A | * | 12/1995 | Kain | 297/256.16 |
| 5,746,478 A | * | 5/1998 | Lumley et al. | 297/250.1 X |
| 6,033,019 A | * | 3/2000 | Hession-Kunz et al. | 297/256.11 X |
| 6,142,440 A | * | 11/2000 | Gratz et al. | 248/346.01 |
| 6,170,911 B1 | * | 1/2001 | Kassai et al. | 297/256.13 X |

* cited by examiner

Primary Examiner—Peter M. Cuomo
Assistant Examiner—Stephen Vu
(74) Attorney, Agent, or Firm—Wenderoth, Lind & Ponack, L.L.P.

(57) ABSTRACT

A booster seat has a seat member (14) and armrests (12a, 13a), and the distance between the armrests (12a, 13a) can be automatically changed according to the height of the support portion (14a) of the seat member (14). The armrests (12a, 13a) are formed on side members (12, 13) extended on the opposite sides of the support portion (14a) of the seat member 14 on a base (11) mounted on a seat of a vehicle. Tapered, wedge-shaped blocks (17, 18) are arranged on the inner side surfaces of the side members (12, 13) so as to extend toward a middle portion of the support portion (14a). When the side members (12, 13) and the wedge-shaped blocks (17, 18) are moved on the base (11) in directions along the width of the support portion (14a), the seat member (14) is moved vertically relative to the base (11) by the cooperative action of the upper surfaces (17a, 18a) of the wedge-shaped blocks (17, 18) and the bottom surface (14b) of the seat member (14) and, at the same time, the distance between the armrests (12a, 13a) is adjusted.

13 Claims, 8 Drawing Sheets

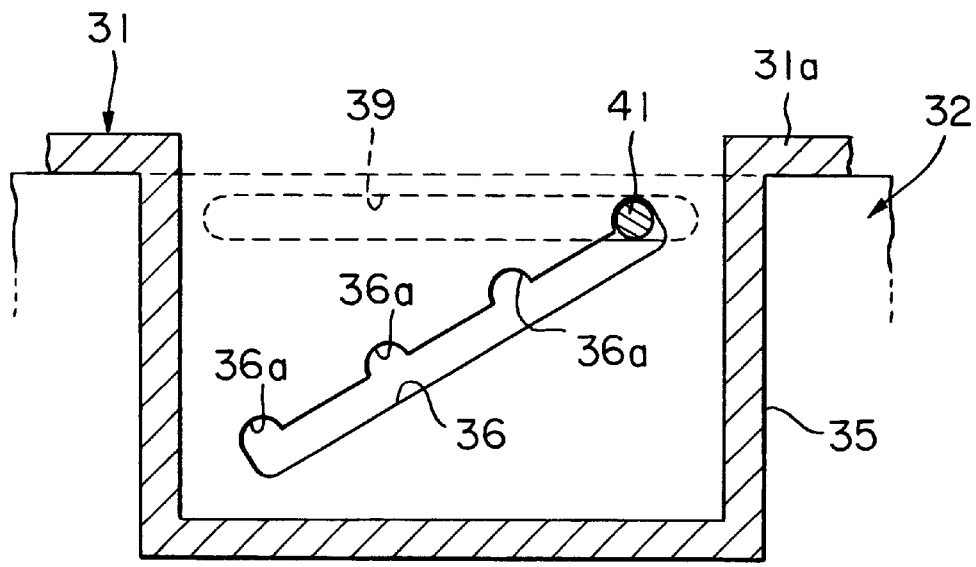
F I G. 8A
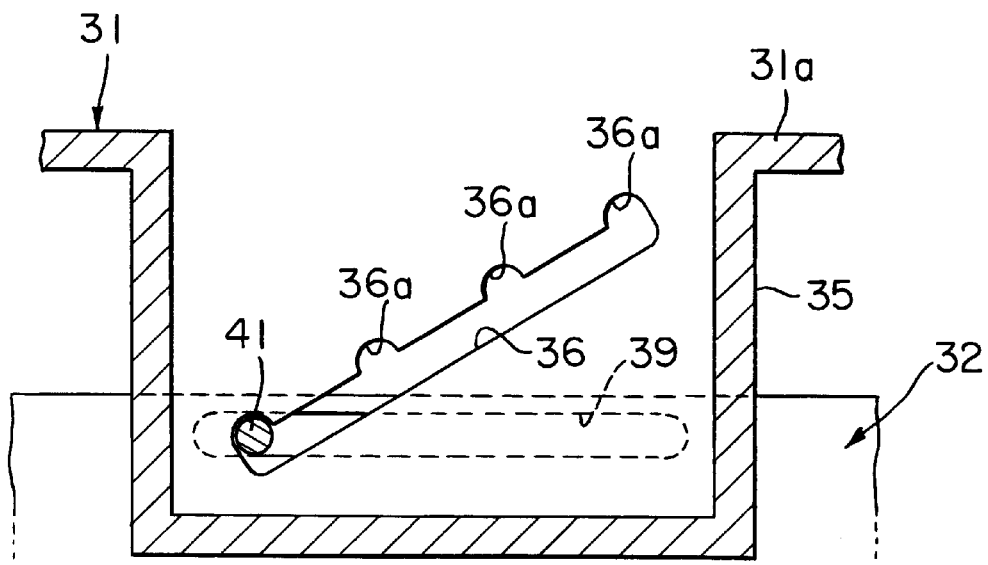
F I G. 8B

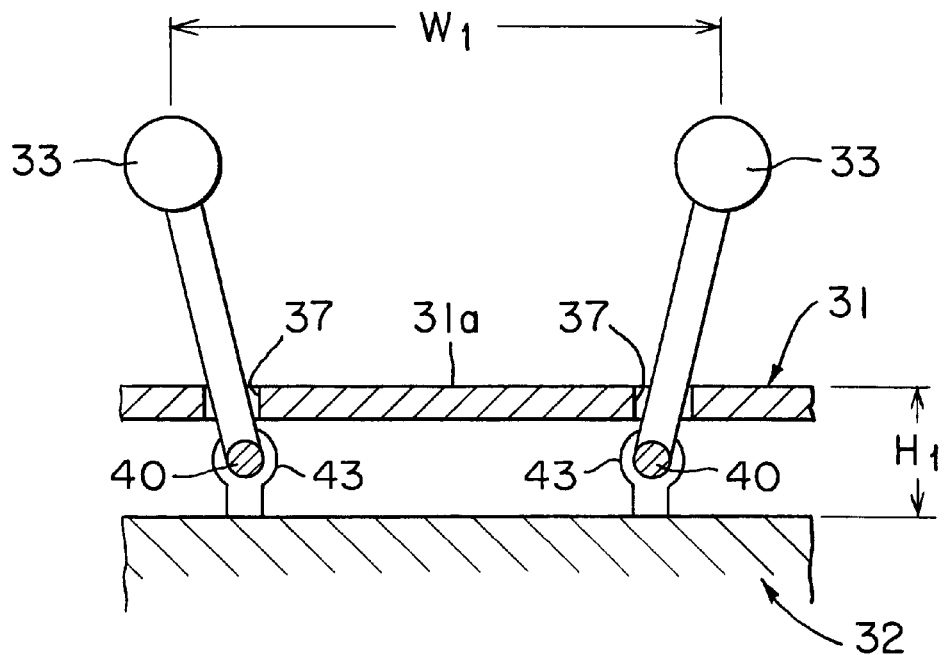
F I G. 9A
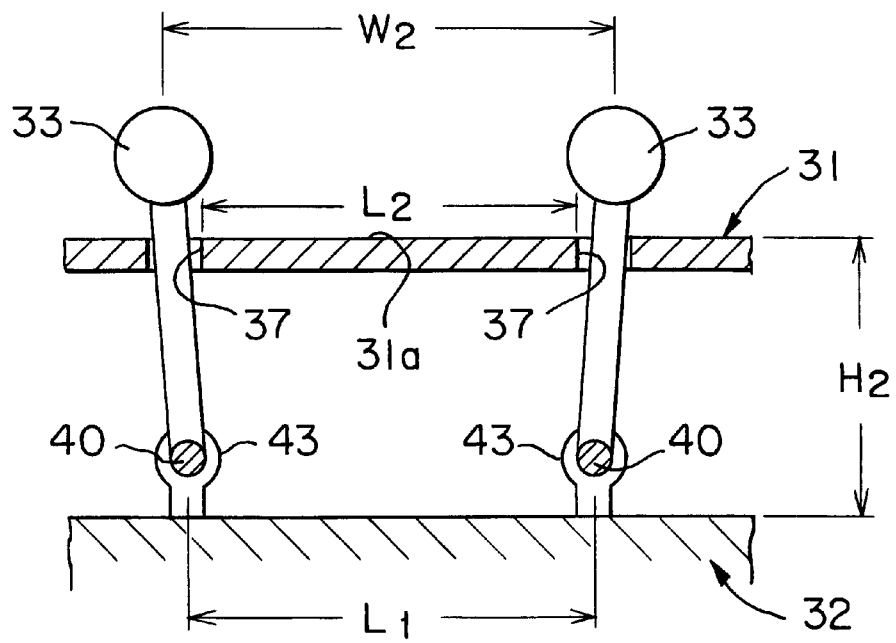
F I G. 9B

BOOSTER SEAT

BACKGROUND OF THE INVENTION

1. Field of the Invention

The present invention relates to a booster seat and, more specifically, to a booster seat having armrests and a seat member. The booster seat is capable of changing the distance between the armrests according to the height of the support portion of the seat member.

2. Description of the Related Art

A booster seat is used on a vehicle to seat a child taller than babies and shorter than adults, such as a schoolchild (hereinafter referred to simply as "child"), at a proper level on the seat of the vehicle.

Generally, a seat belt cannot be properly put around a child if the child is seated on the seat of a vehicle. Therefore, a booster seat is placed on the seat of the vehicle and the child is seated on the booster seat so that the apparent height of the child is great enough to put the seat belt around the child.

A known booster seat is provided with armrests that can be moved to adjust the width of the support portion of a seat member according to the build of a child to be seated on the booster seat.

In this known booster seat, the height of the support portion remains unchanged regardless of the width thereof. Therefore the booster seat is narrow to a tall child and is unable to hold a short child steady.

SUMMARY OF THE INVENTION

The present invention has been made in view of such a problem and it is therefore an object of the present invention to provide a booster seat having armrests and a seat member, in which the distance between the armrests can be changed according to the height of the support portion of the seat member.

According to the present invention, a booster seat comprises a base to be mounted on a seat of a vehicle; a seat member placed on the base and having a support portion; a pair of armrests disposed on opposite sides of the seat member, respectively; a seat height adjusting mechanism capable of vertically moving the seat member relative to the base to adjust the height of the support portion of the seat member, and an armrest adjusting mechanism capable of adjusting the distance between the armrests according to the vertical movement of the seat member by the seat height adjusting mechanism. The distance between the armrests is decreased when the height of the support portion of the seat member is increased, and is increased when the height of the support portion of the seat member is decreased.

In the booster seat according to the present invention, it is preferable that the seat height adjusting mechanism comprises a plurality of wedge-shaped blocks disposed between the base and the seat member, tapered from the opposite sides of the support portion toward the middle of the support portion, respectively, and each having an upper surface serving as a first slope. A bottom part of the seat member faces the plurality of wedge-shaped blocks and has a second slope corresponding to the first slopes. The seat member can be moved vertically relative to the base by the cooperative action of the first slopes of the plurality of wedge-shaped blocks and the second slope of the seat member when the plurality of wedge-shaped blocks are moved in directions along the width of the support portion. It is also preferable that the armrest adjusting mechanism includes a pair of side members extended along the opposite sides of the support portion of the seat member on the base, connected to the outer ends of the plurality of wedge-shaped blocks, respectively, and is provided with the armrests, respectively. The distance between the armrests can be adjusted by moving the side members together with the plurality of wedge-shaped blocks on the base in a direction along the width of the support portion.

In the booster seat according to the present invention, it is preferable that the seat height adjusting mechanism includes an operating bar provided with pins extending along the width of the support portion of the seat member. The base and the seat member are provided with longitudinal slots capable of receiving the pins of the operating bar, respectively, and are inclined relative to each other. The seat member can be moved vertically relative to the base by the cooperative action of the pins of the operating bar and the slots of the base and the seat member when the operating bar is moved longitudinally on the base in a state where the seat member is able to move only vertically relative to the base. It is also preferable that the armrest adjusting mechanism includes a pair of bearing portions formed on the base, each for pivotally supporting one end of each armrest. The seat member is provided with a pair of openings in which the armrests are inserted, respectively. The armrests turn in a plane perpendicular to a direction along the length of the support portion as the seat member is moved vertically relative to the base so that the distance between the armrests is adjusted.

According to the present invention, the seat height adjusting mechanism moves the seat member vertically relative to the base to adjust the height of the support portion of the seat member, and the armrest adjusting mechanism moves the armrests according to the vertical movement of the seat member by the seat height adjusting mechanism to adjust the distance between the armrests. Thus, the distance between the armrests can be automatically adjusted according to the adjustment of the height of the support portion of the seat member. When the height of the support portion is decreased for a tall child, the distance between the armrests increases, so that the tall child can be comfortably seated on the booster seat. When the height of the support portion is increased for a short child, the distance between the armrests decreases, so that the short child can be seated on the booster seat in a steady position.

According to the present invention, when the seat member is moved vertically relative to the base by the cooperative action of the seat member and the plurality of wedge-shaped blocks capable of moving along the width of the support portion, and the distance between the armrests is adjusted by moving the pair of side members in coordination with the movement of the wedge-shaped blocks, the seat member can be vertically moved and the distance between the armrests can be adjusted by mechanical mechanisms. Thus, the booster seat is simple in construction and capable of functioning with reliability.

According to the present invention, when the seat member is moved vertically relative to the base by the cooperative action of the pins of the operating bar that move along the length of the support portion on the base, and the slots of the base and the seat member, and the distance between the armrests is adjusted by turning the armrests in coordination with the vertical movement of the seat member relative to the base, the operations for vertically moving the seat member and adjusting the distance between the armrests can be very easily achieved, and the seat member can be vertically moved and the distance between the armrests can be adjusted by mechanical mechanisms. Thus, the booster seat is simple in construction and capable of functioning with reliability.

BRIEF DESCRIPTION OF THE DRAWINGS

Preferred embodiments of the present invention will be described with reference to the accompanying drawings, in which:

FIGS. 3A and 3B are diagrammatic views of assistance in explaining the operation of the booster seat shown in FIG. 1, in which FIG. 3A shows a state where a seat member is lowered and FIG. 3B shows a state where the seat member is raised;

FIGS. 8A and 8B are diagrammatic sectional views of assistance in explaining the operation of the booster seat shown in FIG. 6, in which FIG. 8A shows a state where a seat member is lowered and FIG. 8B shows a state where the seat member is raised; and FIGS. 9A and 9B are diagrammatic sectional views of assistance in explaining the operation of the booster seat shown in FIG. 6, in which FIG. 9A shows a state where armrests are spaced a long distance apart and FIG. 3B shows a state where the armrest are spaced a short distance apart.

DETAILED DESCRIPTION OF THE INVENTION

Figure 1:
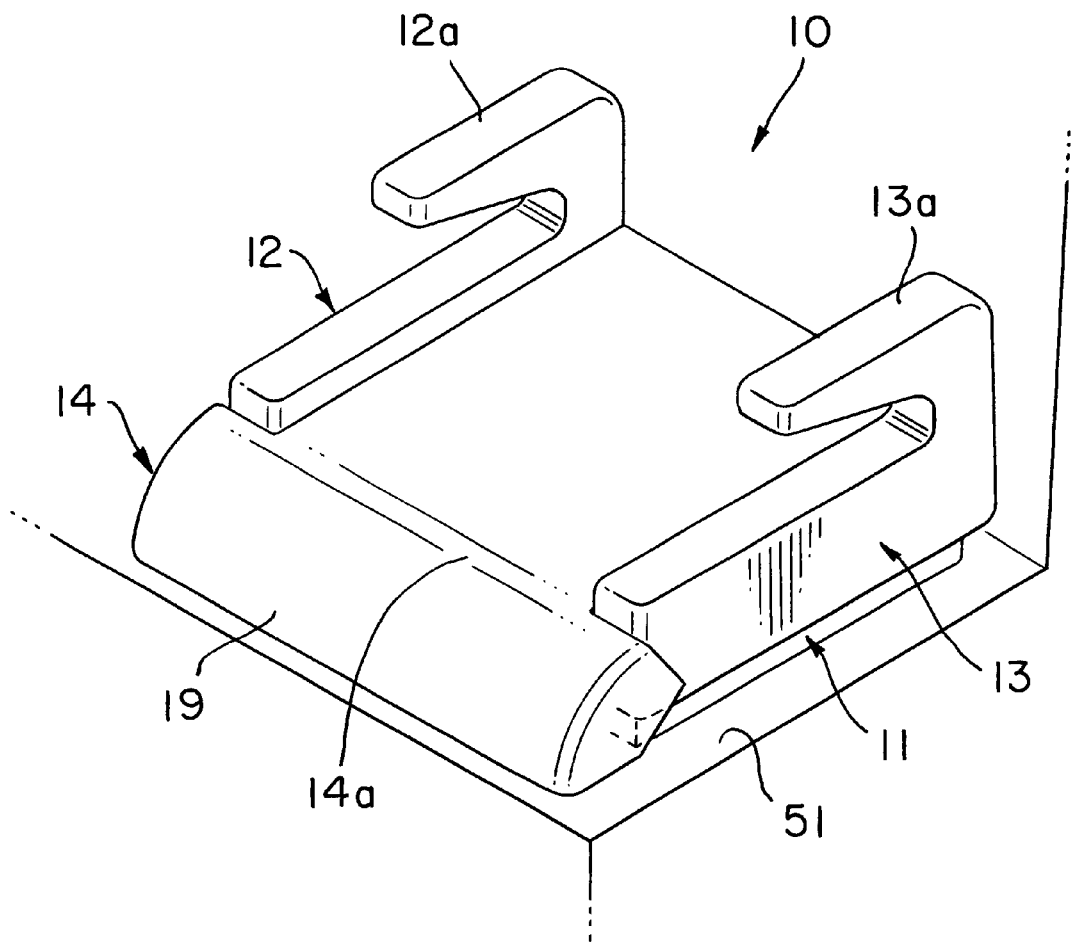
FIG. 1 is a perspective view of a booster seat in a first embodiment of the present invention.
Figure 2:
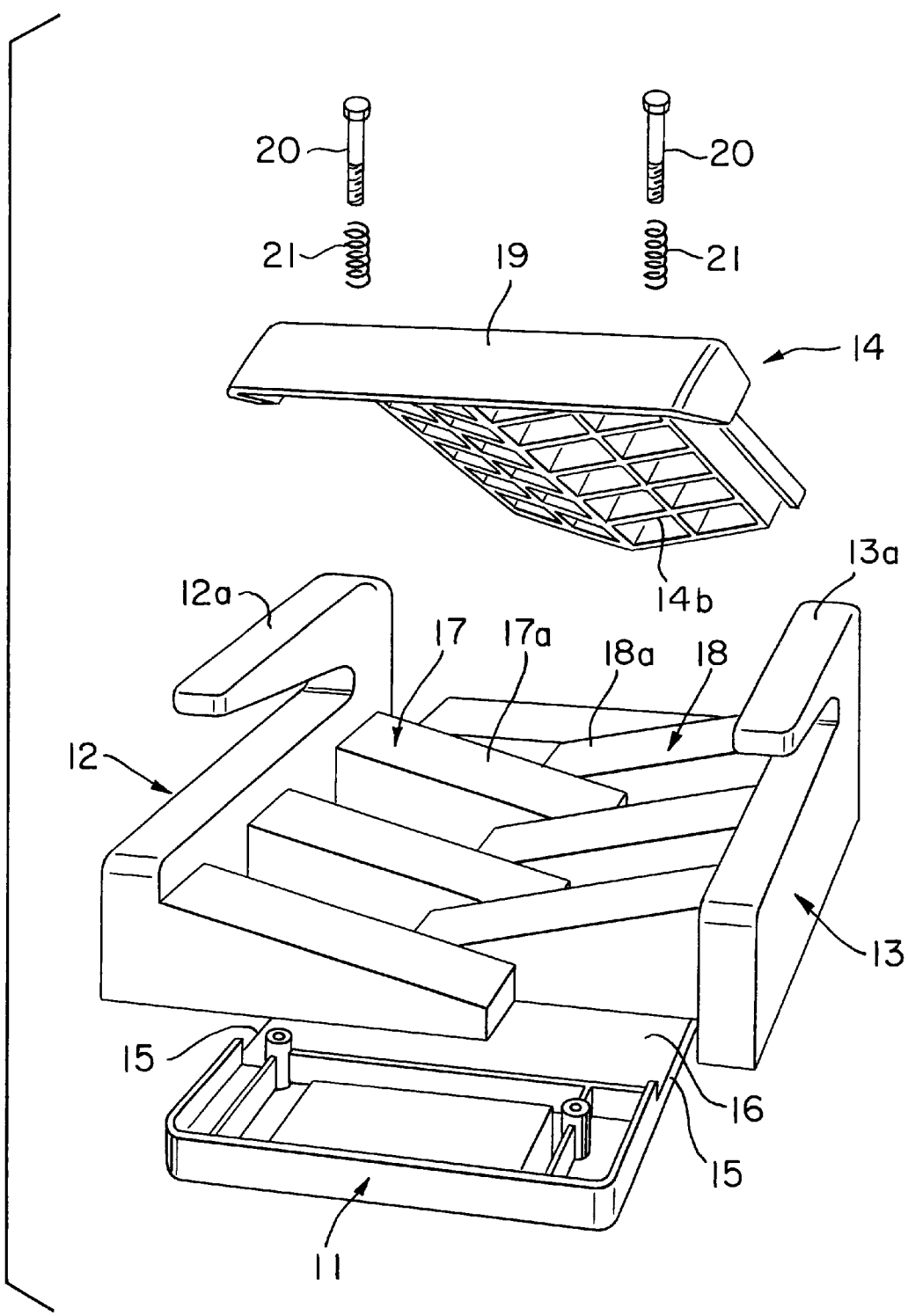
FIG. 2 is an exploded perspective view of the booster seat shown in FIG. 1.
Figure 3A:
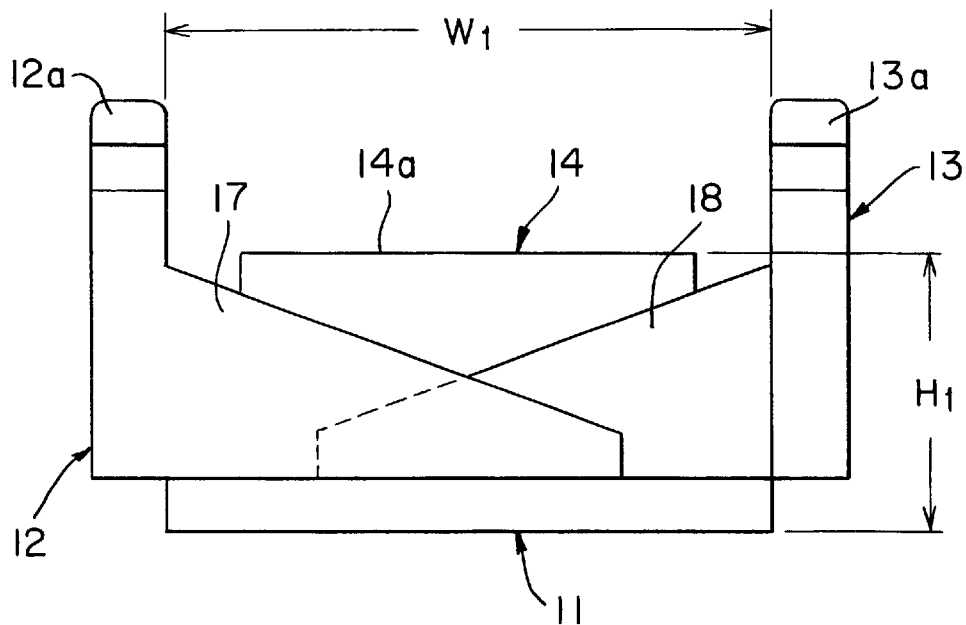
Figure 3B:
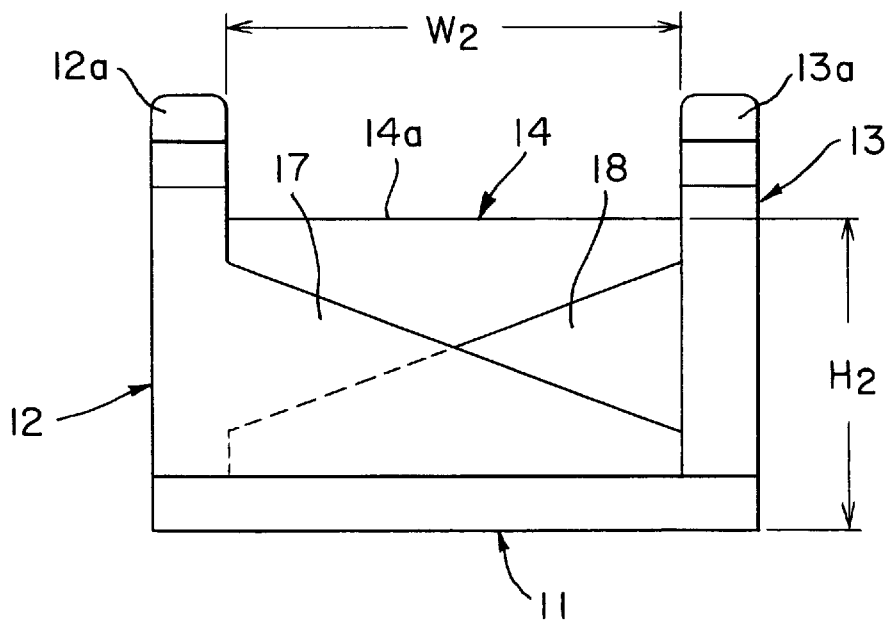

FIGS. 1 to 3 show a booster seat in a first embodiment of the present invention.

Referring to FIG. 1, a booster seat 10 has a base 11 to be mounted on and fastened to a seat 51 of a vehicle, such as an automobile, a seat member 14 placed on the base 11 and having a support portion 14a for supporting a child thereon and armrests 12a and 13a disposed on opposite sides of the support portion 14a of the seat member 14, respectively, to support the arms of the child seated on the seat member 14. The armrests 12a and 13a are formed on side members 12 and 13 extended along opposite sides of the support portion 14a of the seat member 14 on the base 11, respectively.

As shown in FIG. 2, a plurality of tapered, wedge-shaped blocks 17 and 18 are arranged at equal intervals on the side members 12 and 13 so as to project from the inner side surfaces of the side members 12 and 13, respectively. The wedge-shaped blocks 17 and 18 extend from the side surfaces of the side members 12 and 13 toward a middle portion of the support portion 14a, respectively, i.e., toward each other. The first group of wedge-shaped blocks 17 and the second group of wedge-shaped blocks 18 are arranged alternately. The wedge-shaped blocks 17 and 18 have sloping upper surfaces 17a and 18a (first slopes), respectively.

The seat member 14 is placed on the wedge-shaped blocks 17 and 18. A bottom portion of the seat member 14 facing the wedge-shaped blocks 17 and 18 has a V-shaped bottom surface (second slopes) 14b corresponding to the sloping upper surfaces 17a and 18a. The seat member 14 has a skirt 19 forming a front wall.

Recesses 15 are formed in the side walls of the base 11. The wedge-shaped blocks 17 and 18 projecting from the side members 12 and 13 are inserted through the recesses 15 into the base 11. The base 11 has a guide surface 16 flush with the bottom surfaces of the recesses 15 and extending between the recesses 15. The side members 12 and 13 and the wedge-shaped blocks 17 and 18 are moved on the base 11 in directions along the width of the support portion 14a to raise and lower the seat member 14 relative to the base 11 by the cooperative action of the sloping upper surfaces 17a and 18a of the wedge-shaped blocks 17 and 18 and the bottom surface 14b of the seat member 14. The distance between the armrests 12a and 13a is adjusted by moving the side members 12 and 13 and the plurality of wedge-shaped blocks 17 and 18 on the base 11 in directions along the width of the support portion 14a.

The wedge-shaped blocks 17 and 18 form a seat height adjusting mechanism that moves the seat member 14 vertically relative to the base 11 to adjust the height of the support portion 14a of the seat member 14. The side members 12 and 13 form an armrest adjusting mechanism that adjusts the distance between the armrests 12a and 13a in coordination with the vertical movement of the seat member 14 caused by the wedge-shaped blocks 17 and 18 having outer ends connected to the side members 12 and 13. The distance between the armrests 12a and 13a is decreased by the armrest adjusting mechanism when the height of the support portion 14a of the seat member 14 is increased by the seat height adjusting mechanism, and is increased by the armrest adjusting mechanism when the height of the support portion 14a of the seat member 14 is decreased by the seat height adjusting mechanism.

The operation of the booster seat in the first embodiment will be described hereinafter.

FIG. 3A shows the booster seat 10 shown in FIGS. 1 and 2 in a state where the armrests 12a and 13a are spaced a maximum distance W1 apart and the support portion 14a is at a minimum height H1.

As the side members 12 and 13 are moved from positions shown in FIG. 3A toward each other, higher portions of the upper surfaces 17a and 18a of the wedge-shaped blocks 17 and 18 come into engagement with the seat member 14 to push up the seat member 14. When the distance between the armrests 12a and 13a is decreased to a minimum distance W2 (W2<W1), the height of the support portion 14a is increased to a maximum height H2 (H2>H1).

Preferably, the booster seat 10 is provided with positioning members for preventing the longitudinal and lateral displacement of the seat member 14 to ensure the satisfactory operation of the booster seat 10. For example, it is preferable to prevent the longitudinal and lateral displacement of the seat member 14 by passing bolts 20 through the seat member 14 and screwing the same in threaded holes formed in predetermined portions of the base 11 as shown in FIG. 2. Preferably, helical compression springs 21 are put on the bolts 20 to bias the seat member 14 toward the wedge-shaped blocks 17 and 18. The helical compression springs 21 effectively prevent the seat member 14 from rattling.

Figure 4:
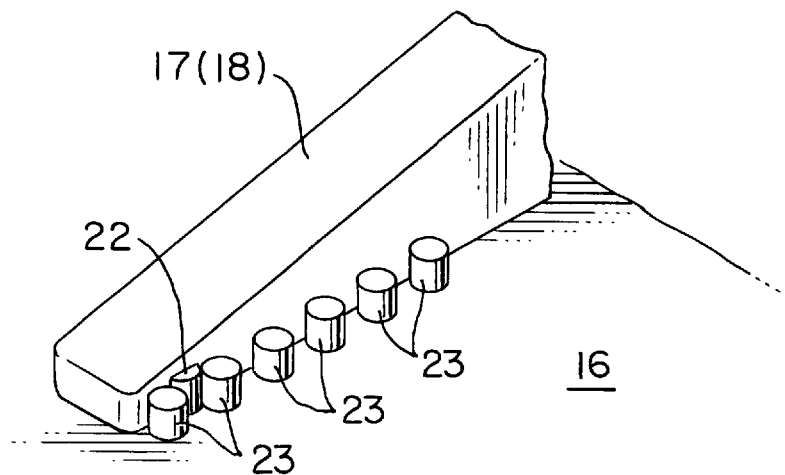
FIG. 4 is a fragmentary perspective view of a locking mechanism included in the booster seat shown in FIG. 1.

Preferably, the wedge-shaped blocks 17 and 18 are locked in place on the base 11 by a locking mechanism. For example, it is preferable to form a projection 22 on one side surface of each of the wedge-shaped blocks 17 and 18, and to form a plurality of projections 23 on the guide surface 16 of the base 11 at predetermined intervals to engage the projection 22 in a space between the adjacent projections 23 as shown in FIG. 4 to retain each of the wedge-shaped blocks 17 and 18 at a desired position.

Figure 5:
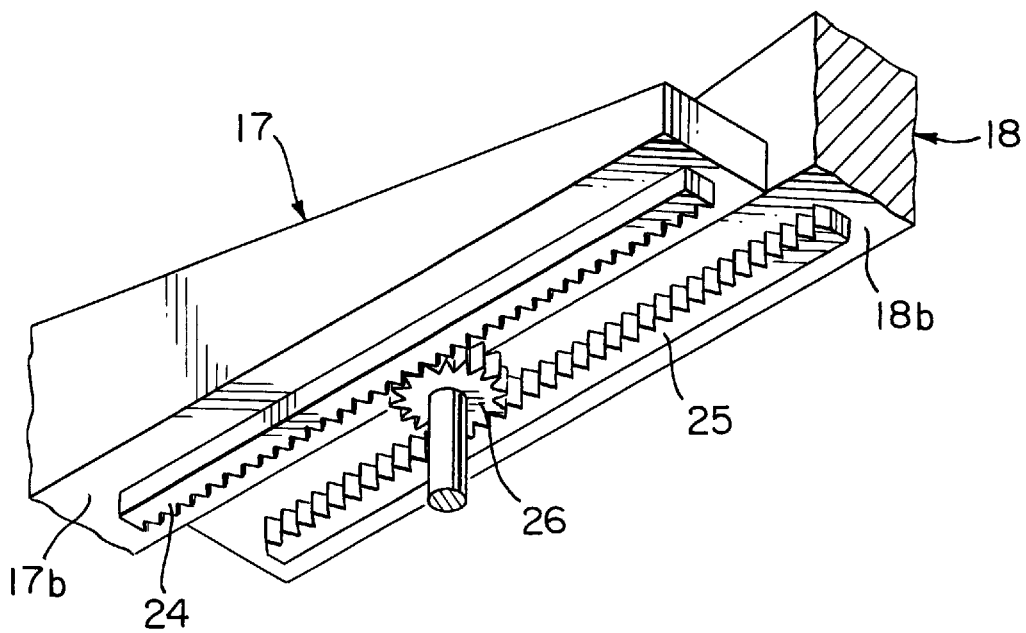
FIG. 5 is a fragmentary perspective view of an interlocking mechanism for interlocking wedge-shaped members included in the booster seat shown in FIG. 1.

It is also possible to interlock the wedge-shaped block 17 projecting from one side member 12 and the wedge-shaped block 18 projecting from the side member 13 and adjacent to the wedge-shaped block 17 by an interlocking mechanism. For example, it is preferable to move the wedge-shaped blocks 17 and 18 by the same distance in the opposite directions, respectively, by forming parallel racks 24 and 25 on the bottom surfaces 17b and 18b of the wedge-shaped blocks 17 and 18, and providing a pinion 26 supported on the base 11 so as to engage both of the racks 24 and 25 as shown in FIG. 5.

A booster seat in a second embodiment of the present invention will be described with reference to FIGS. 6 to 9B.

Figure 6:
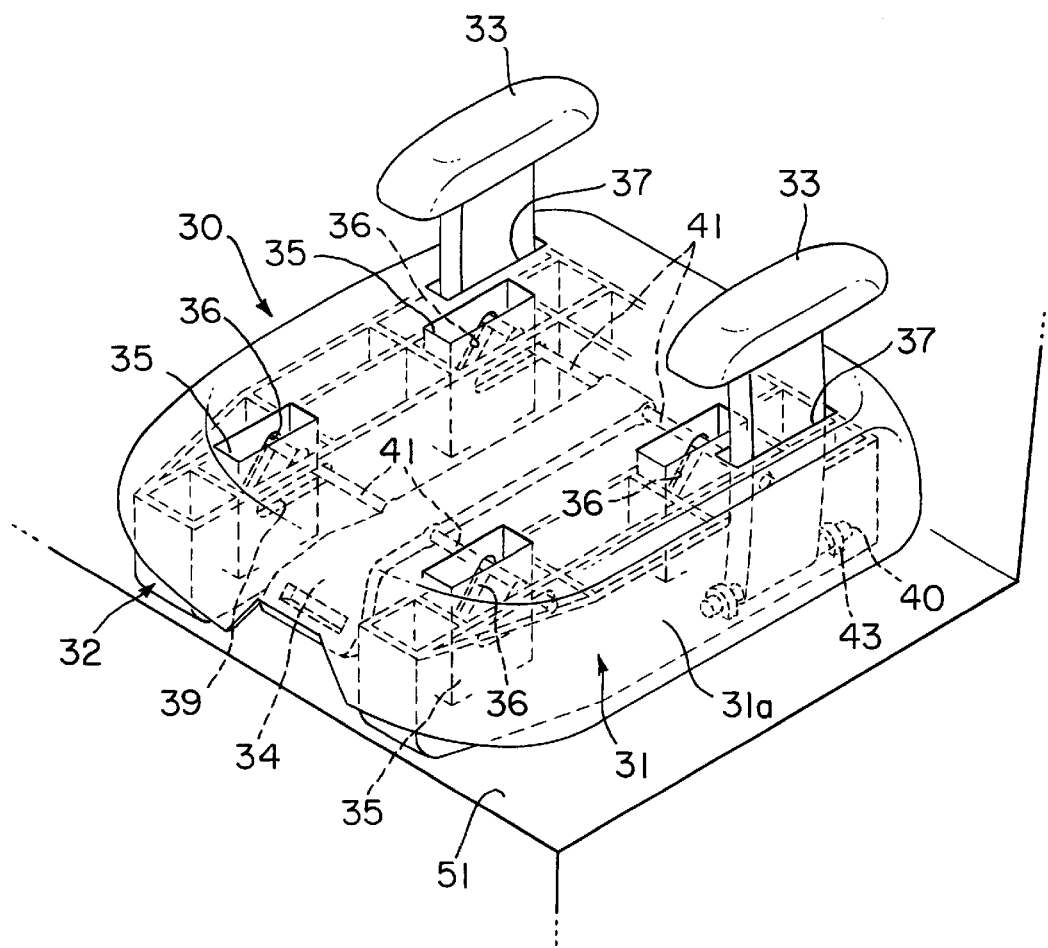
FIG. 6 is a perspective view of a booster seat in a second embodiment of the present invention.

Referring to FIG. 6, a booster seat 30 has a base 32 to be mounted on and fastened to a seat 51 of a vehicle, such as an automobile, a seat member 31 placed on the base 32 and having a support portion 31a for supporting a child thereon, armrests 33 disposed on opposite sides of the support portion 31a of the seat member 31, respectively, to support the arms of the child seated on the seat member 31, and an operating bar 34 disposed between the base 32 and the seat member 31.

Figure 7:
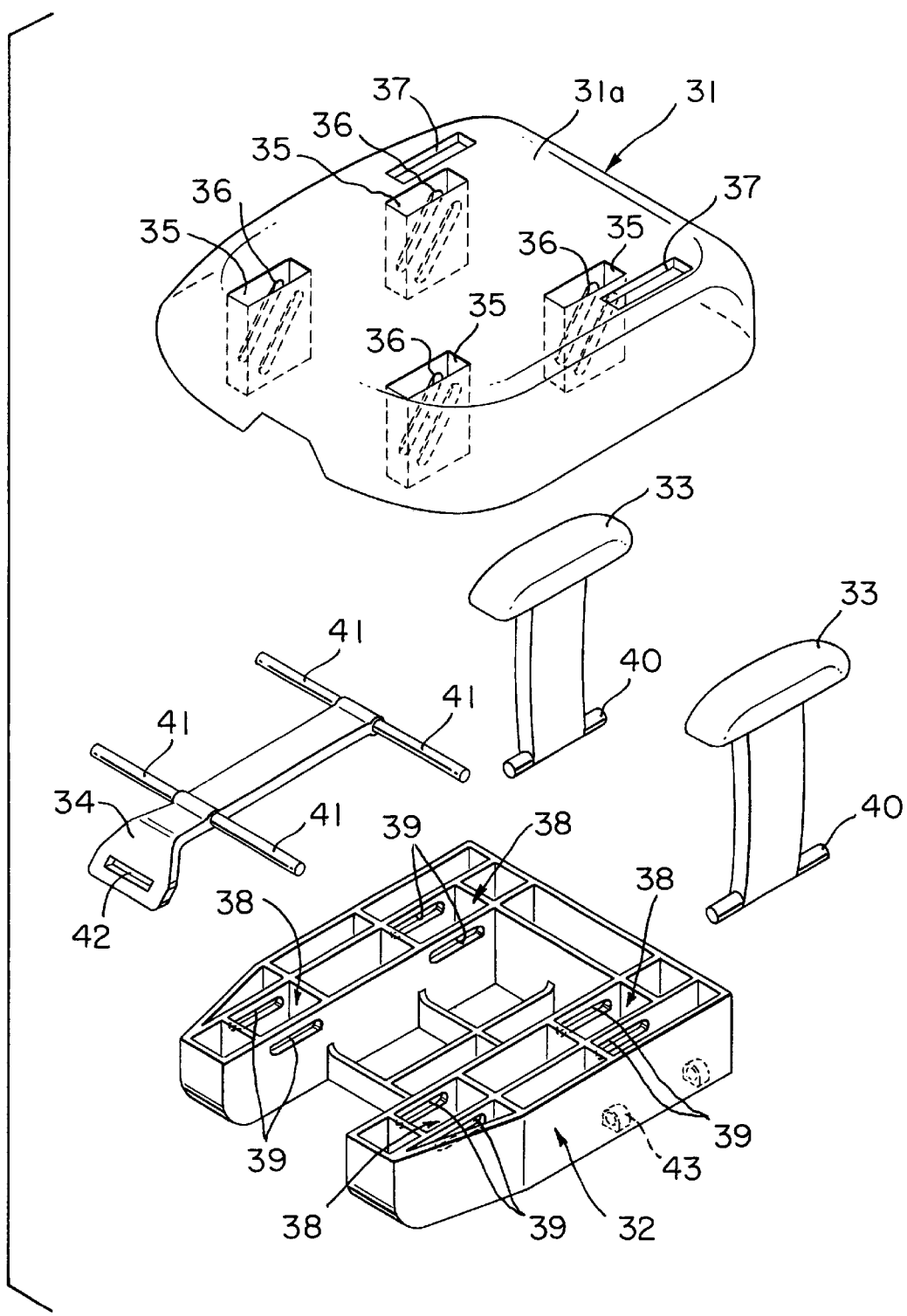
FIG. 7 is an exploded perspective view of the booster seat shown in FIG. 6.

FIGS. 6 and 7 shown four box-shaped protrusions 35 having a rectangular sectional shape. Slots 36 are formed in the side walls of the box-shaped protrusions 35 so as to slope at an inclination to a direction along the length of the support portion 31a. Two openings 37 are formed in the support portion 31a of the seat member 31, and the armrests 33 pass through the openings 37.

Four box-shaped cavities 38 are formed in the base 32 to receive the box-shaped protrusions 35 of the seat member 31, respectively. Substantially horizontal, longitudinal slots 39 are formed in side walls of the box-shaped cavities 38.

The armrests 33 are provided at their lower ends with longitudinal shafts 40, respectively. The shafts 40 are parallel to the length of the support portion 31a and are fitted in bearing portions 43 (FIG. 6) formed in the base 32, such that the armrests 33 are able to turn on the shafts 40.

The operating bar 34 is provided with four pins 41 laterally projecting from the side surfaces thereof in directions parallel to the width of the support portion 31a of the seat member 31. A handle 42 is formed in a front portion of the operating bar 34.

The seat member 31 is put on the base 32 so as to cover the base 32 with the box-shaped protrusions 35 of the seat member 31 received in the box-shaped cavities 38 of the base 32, respectively. The operating bar 34 is inserted from the front side of the base 32 in a space between the seat member 31 and the base 32, and the pins 41 of the operating bar 34 are engaged in the slots 36 and 39 of the seat member 31 and the base 32, respectively. The shafts 40 of the armrests 33 passed through the openings 37 of the seat member 31 are fitted in the bearing portions 43 (FIG. 6) formed in the base 32. Thus, the seat member 31 is able to move only vertically because the box-shaped protrusions 35 are fitted in the box-shaped cavities 38. When the operating bar 34 is moved longitudinal on the base 32 along the support portion 31a, the seat member 31 is moved vertically relative to the base 32 by the cooperative action of the pins 41 of the operating bar 34 and the slots 36 and 39 of the seating member 31 and the base 32. As the seat member 31 is moved vertically relative to the base 32, the armrests 33 turn in a plane perpendicular to the length of the support portion 31a under the restriction of the openings 37 (i.e., by being guided by the openings 37), so that the distance between the armrests 33 is changed accordingly.

The operating bar 34 provided with the pins 41, the side walls provided with the slots 39 of the base 32 and the side walls provided with the slots 36 of the box-shaped protrusions 35 of the seat member 31 form a seat height adjusting mechanism for vertically moving the seat member 31 relative to the base 32 for the adjustment of the support portion 31a of the seat member 31. The bearing portions 43 and portions provided with the openings 37 of the seat member 31 form an armrest adjusting mechanism for adjusting the distance between the armrests 33 in coordination with the vertical movement of the seat member 31 caused by operating the operating bar 34. The distance between the armrests 33 is decreased by the armrest adjusting mechanism when the height of the support portion 31a of the seat member 31 is increased by the seat height adjusting mechanism and is increased when the height of the support portion 31a of the seat member 31 is decreased.

The operation of the booster seat in the second embodiment will be described hereinafter.

FIG. 8A shows a state of the booster seat 30 shown in FIGS. 6 and 7. The operating bar 34 is moved longitudinally to move the pins 41 of the operating bar 34 in the slots 39 of the base 32. In FIG. 8A, the operating bar 34 is moved to its innermost position and the pins 41 of the operating bar 34 are located at the rear ends of the slots 39 of the base 32, respectively. In this state, the seat member 31 is held at a minimum height H1 (FIG. 9A).

When the operating bar 34 is pulled forward in the state shown in FIG. 8A, the pins 41 of the operating bar 34 move in the slots 39 of the base 32 and push up the seat member 31. When the pins 41 of the operating bar 34 are located at the front ends of the slots 39 as shown in FIG. 8B, the seat member 31 is held at a maximum height H2 (FIG. 9B).

Meanwhile, the armrests 33 are turned away from each other and are inclined at a large inclination such that the distance between the armrests 33 increases to a maximum distance W1 as shown in FIG. 9A when the seat member 31 is held at the minimum height H1.

As the seat member 31 is raised, the armrests 33 are turned under the restriction of the openings 37 of the seat member 31 and approach an upright position. When the support portion 31a reaches the maximum height H2 (H2>H1), the distance between the armrests 33 decreases to a minimum distance W2 (W2<W1).

The distance between the armrests 33 must decrease as the height of the support portion 31a of the seat member 31 increases. Therefore, the distance L1 between the bearing portions 43 formed on the base 32 must be smaller than the distance L2 between the openings 37 of the seat member 31 (L1<L2).

Preferably, the booster seat 30 is provided with a locking mechanism for locking the operating bar 34 on the base 32 to ensure the satisfactory operation of the booster seat 30. For example, it is preferable to form a plurality of semicircular recesses 36a at equal intervals in the upper edges of the slots 36 of the seat member 31 as shown in FIGS. 8A and 8B. When the pins 41 of the operating bar 34 drop into the semicircular recesses 36a, respectively, the operating bar 34 is restrained from longitudinal movement and hence the seat member 31 can be securely held at a desired height. When the seat member 31 is depressed with the pins 41 of the operating bar 34 located at predetermined positions in the slots 39 of the base 32, respectively, the seat member 31 is lowered, and the pins 41 of the operating bar 34 move to the right as viewed in FIGS. 8A and 8B and drop into the nearest recesses 36a on the upper side of the predetermined positions, respectively. A mechanism that locks the operating bar 34 directly may be employed instead of the foregoing locking mechanism.

The seat member 31 may be moved vertically by any optional mechanism capable of vertically moving the seat member 31 instead of vertically moving the seat member 31 by the operating bar 34. For example, the wedge-shaped blocks 17 and 18 of the first embodiment shown in FIGS. 1 and 2 may be applied to the second embodiment.

Although the armrests 33 are supported pivotally on the base 32 so as to turn in a plane perpendicular to the length of the support portion 31a of the seat member 31 under the restriction of the openings 37 of the seat member 31 in the second embodiment, the armrests 33 may be operated by any optional turning mechanism provided that the turning mechanism is able to turn the armrests 33 in coordination with the vertical movement of the seat member 31. For example, the armrests 33 may be supported for tuning on the seat member 31 and may be connected to the base 32 by links.

Although the slots 39 of the base 32 are extended horizontally along the length of the support portion 31a and the slots 36 of the seat member 31 are extended so as to slope at an inclination to a direction along the length of the support portion 31a in the second embodiment, it is only necessary that the slots 36 and the slots 39 are inclined relative to each other. For example, the slots 39 of the base 32 may be extended so as to slope at an inclination to a direction along the length of the support portion 31a and the slots 36 of the seat member 31 may be substantially horizontally extended along the length of the support portion 31a.

What is claimed is:

1. A booster seat comprising:
    a base to be mounted on a seat of a vehicle;
    a seat member placed on the base and having a support portion;
    a pair of armrests disposed on opposite sides of the seat member, respectively;
    a seat height adjusting mechanism operable to vertically move the seat member relative to the base to adjust a height of the support portion of the seat member; and
    an armrest adjusting mechanism operable to automatically adjust a distance between the armrests based on the vertical movement of the seat member by the seat height adjusting mechanism so that the distance between the armrests is decreased when the height of the support portion of the seat member is increased, and so that the distance between the armrests is increased when the height of the support portion of the seat member is decreased.

2. The booster seat according to claim 1, wherein the seat height adjusting mechanism comprises a plurality of wedge-shaped blocks disposed between the base and the seat member, each of the blocks being tapered in a direction from one of the opposite sides of the seat member toward a middle of the seat member, respectively, and each of the blocks having an upper surface serving as a first slope;
    wherein a bottom part of the seat member faces the plurality of wedge-shaped blocks and has a second slope corresponding to the first slope of each of the blocks; and
    wherein the seat member is arranged so as to move vertically relative to the base by a cooperative action of the first slope of each of the plurality of wedge-shaped blocks and the second slope of the seat member when the plurality of wedge-shaped blocks are moved in horizontal directions along the width of the support portion of the seat member.

3. The booster seat according to claim 2, further comprising a locking mechanism for locking the wedge-shaped blocks on the base.

4. The booster seat according to claim 2, wherein the blocks are arranged so that adjacent blocks alternately extend from opposite sides of the seat member toward each other, respectively, the booster seat further comprising an interlocking mechanism for interlocking the adjacent blocks extending toward each other.

5. The booster seat according to claim 2, wherein the armrest adjusting mechanism comprises a pair of side members extending along the opposite sides of the seat member on the base, each of the pair of side members being connected to the outer ends of the plurality of wedge-shaped blocks, respectively, each of the pair of armrests being connected to a respective one of the pair of side members so that the distance between the armrests is adjusted by moving the side members together with the plurality of wedge-shaped blocks on the base in a horizontal direction along the width of the support portion of the seat member.

6. The booster seat according to claim 1, wherein the seat height adjusting mechanism comprises an operating bar having pins extending along the width of the support portion of the seat member, the base and the seat member having longitudinal slots capable of receiving a respective one of the pins of the operating bar, the slots of the base and the seat member being inclined relative to each other, the seat member being operable to move vertically relative to the base by a cooperative action of the pins of the operating bar and the slots of the base and the seat member when the operating bar is moved longitudinally on the base in a state where the seat member is able to move only vertically relative to the base.

7. The booster seat according to claim 6, wherein the slots formed in the base extend substantially horizontally along the length of the support portion of the seat member and the slots formed in the seat member extend in an inclined direction along the length of the support portion of the seat member so as to be inclined with respect to the substantially horizontal slots formed in the base.

8. The booster seat according to claim 6, wherein the slots formed in the base extend in an inclined direction along the length of the support portion of the seat member and the slots formed in the seat member extend substantially horizontally along the length of the support portion of the seat member so that the slots formed in the base are inclined with respect to the slots formed in the seat member.

9. The booster seat according to claim 6, further comprising a locking mechanism for locking the operating bar on the base.

10. The booster seat according to claim 9, wherein the locking mechanism includes a plurality of recesses formed in an upper edge of each of the slots formed in one of the seat member and the base, each of the recesses being shaped so as to receive the pin of the operating bar.

11. The booster seat according to claim 6, wherein the armrest adjusting mechanism includes a pair of bearing portions formed on the base, each for pivotally supporting one end of each said armrest, the seat member having a pair of openings in which a respective one of the armrests is inserted, the armrests being arranged so as to turn in a plane perpendicular to a direction along the length of the support portion as the seat member is moved vertically relative to the base so that the distance between the armrests is adjusted.

12. The booster seat according to claim 11, wherein a first distance between the bearing portions formed on the base is less than a second distance between the openings formed in the seat member.

13. The booster seat according to claim 1, wherein the seat member is arranged in a plane substantially parallel to the base, the seat height adjusting mechanism being operable to vertically move the seat member relative to the base while maintaining the seat member in a plane substantially parallel to the base.

* * * * *